(12) United States Patent
Karty

(10) Patent No.: US 8,047,498 B1
(45) Date of Patent: Nov. 1, 2011

(54) SUPPORT STAND DEVICE FOR REBAR BENDER

(76) Inventor: Marcus Karty, Simi Valley, CA (US)

( * ) Notice: Subject to any disclaimer, the term of this patent is extended or adjusted under 35 U.S.C. 154(b) by 0 days.

(21) Appl. No.: 12/838,756

(22) Filed: Jul. 19, 2010

(51) Int. Cl.
*F16M 13/00* (2006.01)
(52) U.S. Cl. ........................ 248/545; 248/156
(58) Field of Classification Search ............... 248/163.1, 248/162.2, 545, 530, 156, 508
See application file for complete search history.

(56) References Cited

U.S. PATENT DOCUMENTS

| | | | | |
|---|---|---|---|---|
| 5,320,316 A * | 6/1994 | Baker | ........................ | 248/163.1 |
| 6,254,043 B1 * | 7/2001 | Schwarzler | ................ | 248/163.1 |
| 6,702,482 B2 * | 3/2004 | Sherwin | ........................ | 396/428 |
| 7,654,494 B2 * | 2/2010 | Cartoni et al. | ............. | 248/163.1 |
| 2001/0048059 A1 * | 12/2001 | Jones, II | ........................ | 248/461 |
| 2005/0017139 A1 * | 1/2005 | Tacklind | ........................ | 248/166 |
| 2009/0072100 A1 * | 3/2009 | Zierer et al. | .................. | 248/169 |
| 2011/0073722 A1 * | 3/2011 | Meuret et al. | .................. | 248/169 |

* cited by examiner

*Primary Examiner* — Ramon Ramirez

(57) ABSTRACT

A support stand device for a rebar bender featuring a base with a rebar bender mount; three leg mounts disposed in the base in a symmetrical configuration, three legs removably engagable in the leg mounts; securing means for securing the legs in the respective leg mounts; spike shafts disposed near the bottom ends of each leg; a spike slidably disposed in each spike shaft, the spikes can slide between at least a down position wherein the spike is extended downwardly toward and optionally into a ground surface and an up position wherein the spike is pulled upwardly in the spike shaft and out of the ground surface; securing means for securing the spikes in a position; and striking blocks disposed on the top end of each spike.

6 Claims, 4 Drawing Sheets

US 8,047,498 B1

SUPPORT STAND DEVICE FOR REBAR BENDER

FIELD OF THE INVENTION

The present invention is directed to a support stand for devices including but not limited to rebar benders, more particularly to an adjustable tripod-like support stand for stabilizing rebar benders.

BACKGROUND OF THE INVENTION

Rebar is a type of bar used to reinforce concrete. Manipulating (e.g., bending) of rebar can be physically difficult and requires a rebar bending device. The present invention features a support stand device for a rebar bender, allowing the rebar bender to be stabilized and secured. The support stand device of the present invention also allows for increased portability of rebar benders. The present invention is not limited to use with rebar benders.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a support stand device for a rebar bender or other device. In some embodiments, the support stand device comprises a base having a top surface and a bottom surface; a rebar bender mount extending upwardly from the top surface of the base, the rebar bender mount functions to engage a support beam of a rebar bender; a first leg mount, a second leg mount, and a third leg mount each disposed in the base in a symmetrical configuration; a first leg, a second leg, and a third leg adapted to removably engage the first leg mount, the second leg mount, and the third leg mount, respectively; a first securing means disposed in the first leg mount, a second securing means disposed in the second leg mount, and a third securing means disposed in the third leg mount, the securing means each function to secure the leg in the respective leg mount; a first spike shaft disposed near a bottom end of the first leg, a second spike shaft disposed near a bottom end of the second leg, and a third spike shaft disposed near a bottom end of the third leg; a first spike slidably disposed in the first spike shaft, a second spike slidably disposed in the second spike shaft, and a third spike slidably disposed in the third spike shaft, the spikes can slide between multiple positions in their respective spike shafts including a down position wherein the spike is extended downwardly toward and optionally into a ground surface and an up position wherein the spike is pulled upwardly in the spike shaft and out of the ground surface, the spikes function to secure the support stand device in the ground surface; a fourth securing means disposed in the first spike shaft, a fifth securing means disposed in the second spike shaft, and a sixth securing means disposed in the third spike shaft, the securing means each function to secure the spike in the respective spike shaft; and a striking block disposed on each top end of the spikes, the striking blocks provide a means of moving the spikes from the up position to the down position.

In some embodiments, the base has a generally triangular shape with flattened tips. In some embodiments, the support stand device further comprises floor brackets disposed on the bottom ends of each of the legs, the floor brackets function to help provide an even fit on a ground surface and allow the legs to be secured to the ground surface if desired. In some embodiments, the first securing means is a first locking knob, the second securing means is a second locking knob, and the third securing means is a third locking knob. In some embodiments, the support stand device further comprises a strike pad is disposed atop each of the striking blocks. In some embodiments, the fourth securing means is a fourth locking knob, the fifth securing means is a fifth locking knob, and the sixth securing means is a sixth locking knob.

DESCRIPTION OF PREFERRED EMBODIMENTS

Referring now to FIGS. 1-5, the present invention features a support stand device 100 for a rebar bender 101, allowing the rebar bender 101 to be stabilized and secured. The support stand device of the present invention also allows for increased portability of rebar benders 101. The present invention is not limited to use with rebar benders.

Figure 1:
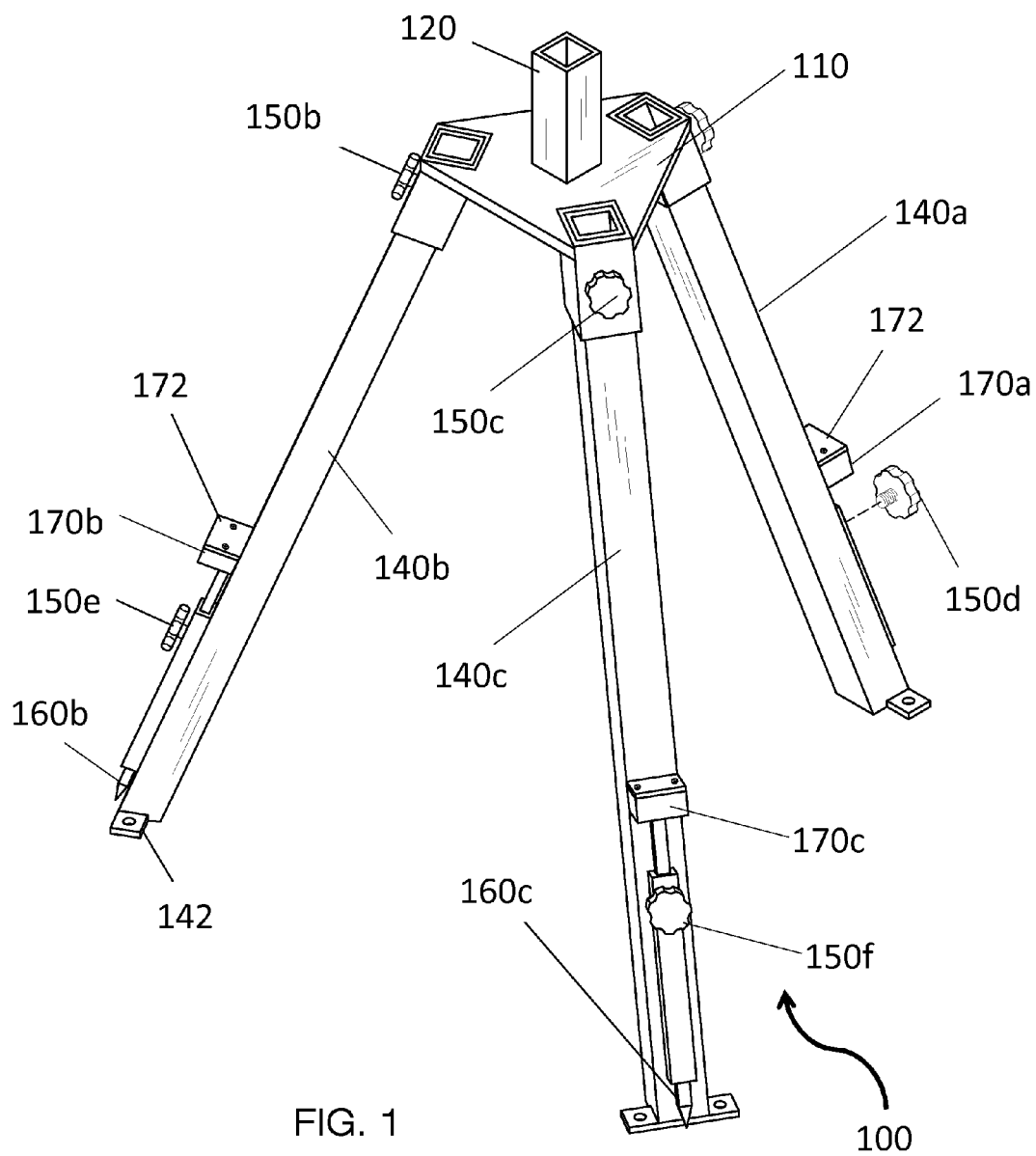
FIG. 1 is a perspective view of the support stand device of the present invention.
Figure 2:
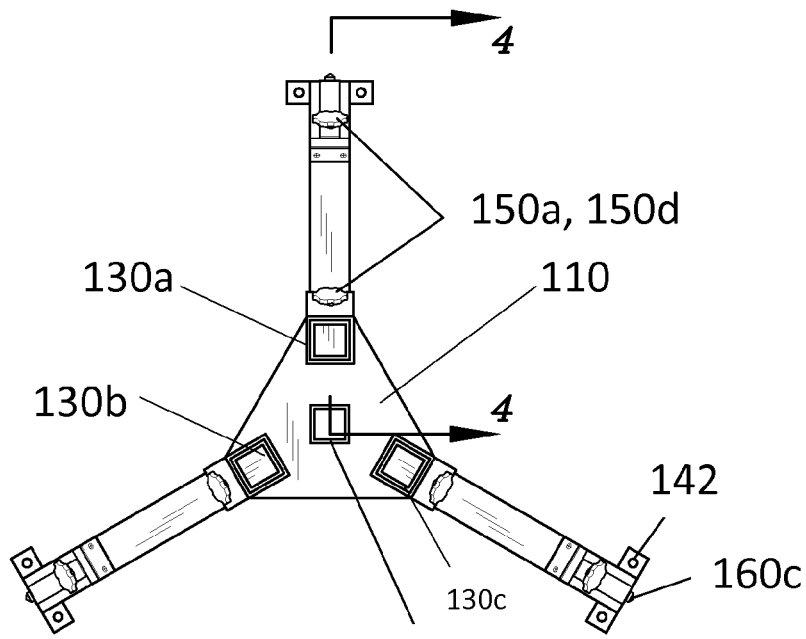
FIG. 2 is a top view of the support stand device of FIG. 1.
Figure 3:
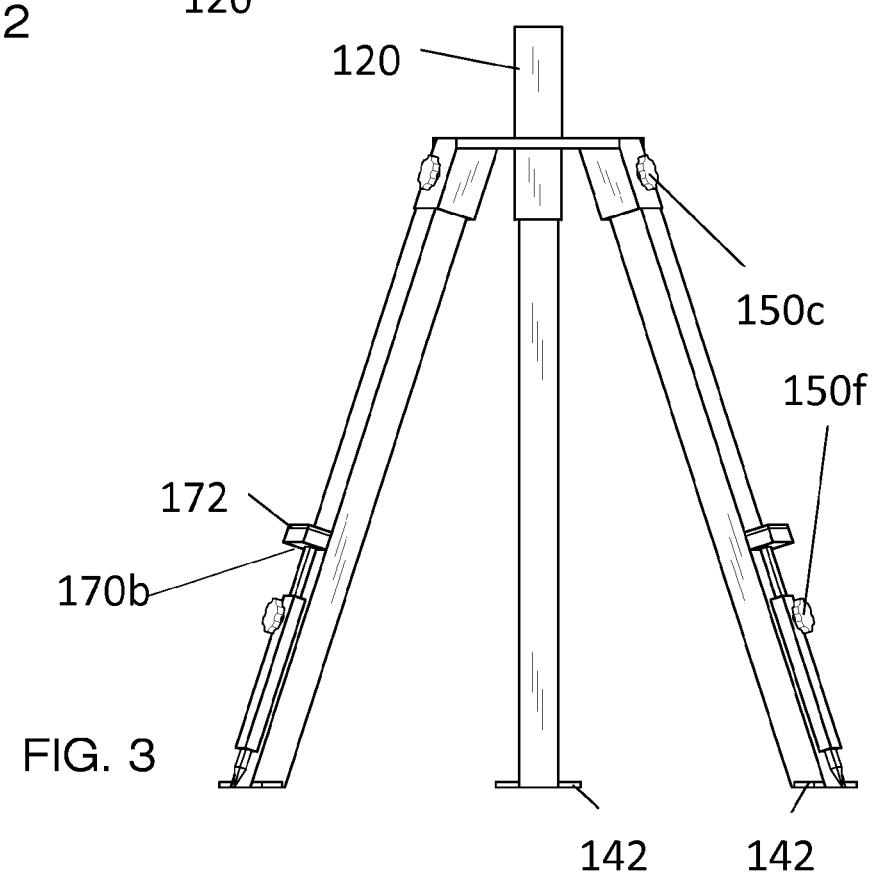
FIG. 3 is a side view of the support stand device of FIG. 1.
Figure 4:
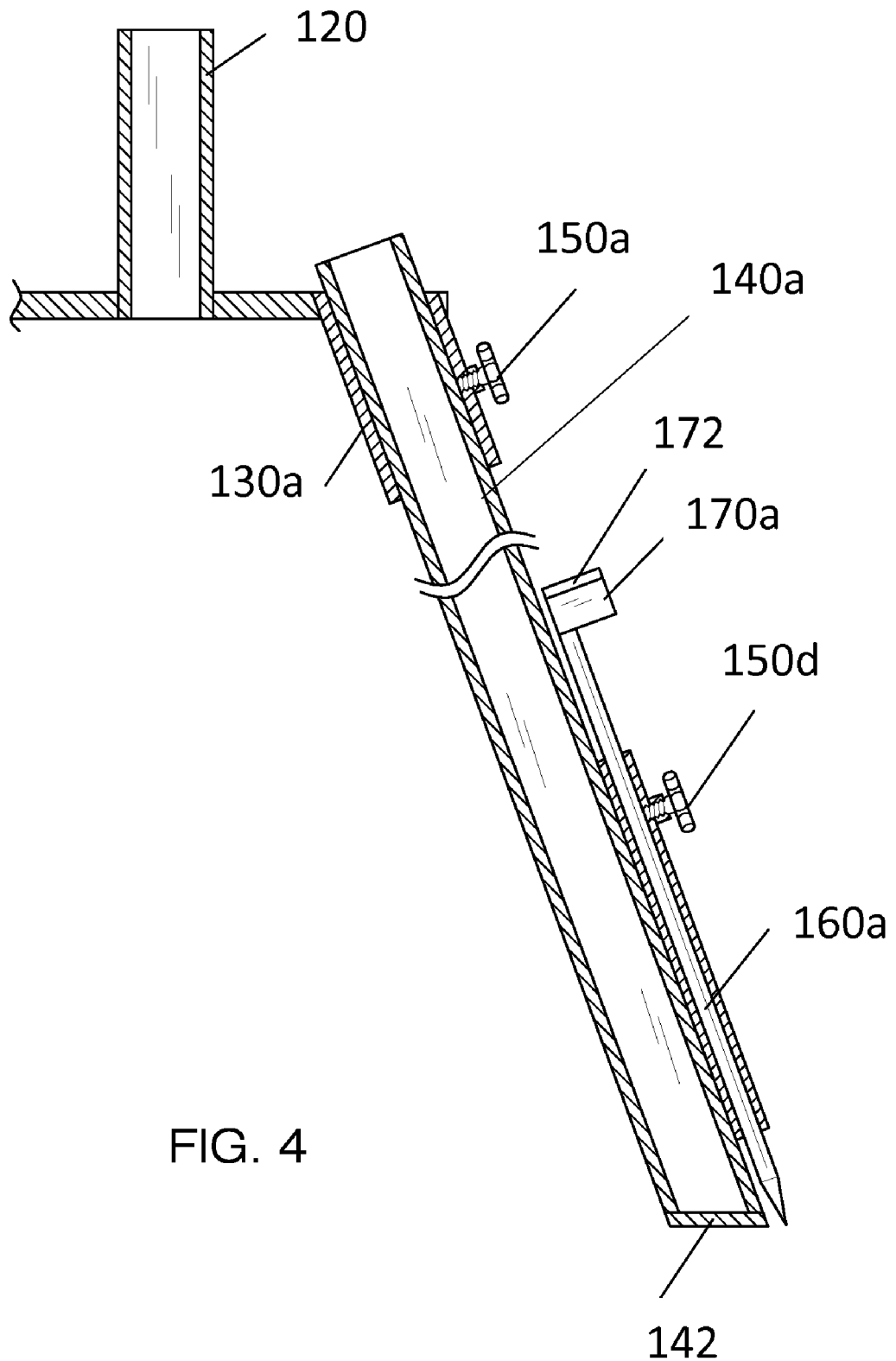
FIG. 4 is a side cross sectional view of the support stand device of FIG. 2.
Figure 5:
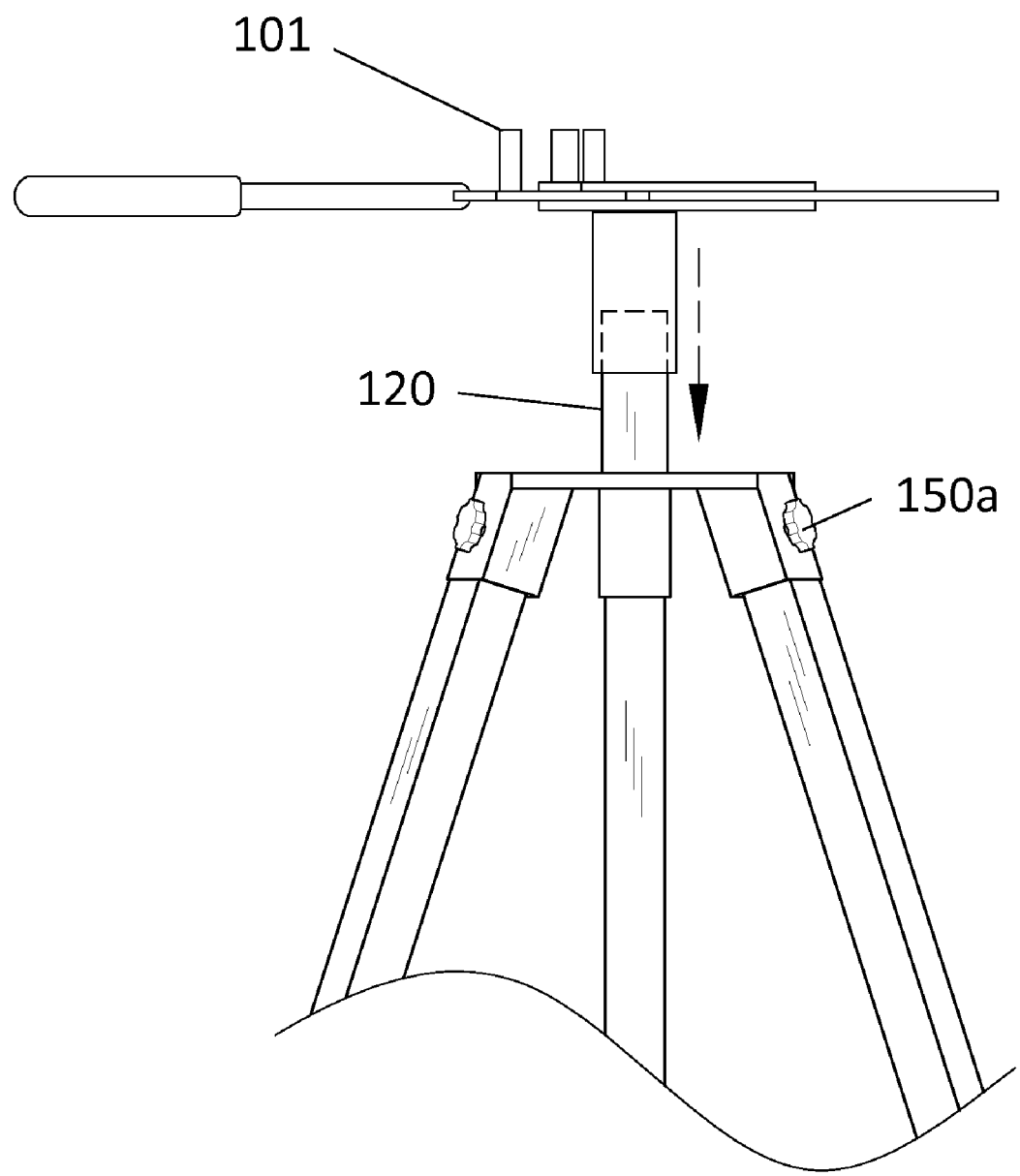
FIG. 5 is an in-use view of the support stand device of the present invention.

The support stand device 100 of the present invention comprises a base 110 having a top surface and a bottom surface. In some embodiments, the base 110 has a generally triangular shape or variation thereof. For example, as shown in FIG. 1 and FIG. 2, the base has a generally triangular shape wherein the tips of the triangular shape are flattened. The base 110 is not limited to the aforementioned shape. For example, in some embodiments, the base 110 is generally rectangular, circular, pentagonal (or other geometrical shape), an irregular shape, the like, or a combination thereof.

Extending upwardly from the top surface of the base 110 is a rebar bender mount 120. The rebar bender mount 120 functions to engage the rebar bender 101. For example, in some embodiments the rebar bender mount 120 is generally hollow and is adapted to snugly receive a support beam of the rebar bender 101. In some embodiments, the rebar bender mount 120 is adapted to snugly fit inside the support beam of the rebar bender 101 (see FIG. 5, for example). The rebar bender mount 120 is not limited to the aforementioned mechanisms for engaging the rebar bender 101.

Disposed in the base 110 in a symmetrical configuration are a first leg mount 130a, a second leg mount 130b, and a third leg mount 130c (see FIG. 2). The first leg mount 130a, a second leg mount 130b, and a third leg mount 130c each function to engage (e.g., removably) and support a first leg 140a, a second leg 140b, and a third leg 140c, respectively. The leg mounts 130 and legs 140 are positioned symmetrically so as to provide an even and balanced support for the rebar bender 101 mounted to the mount 120. The bottom ends of the legs (e.g., floor brackets 142) are generally slanted with respect to the axis of the legs so as to provide an even fit on a ground surface (see FIG. 4). The floor brackets 142 may be securable to the ground surface.

The legs 140 can be secured in the respective leg mounts 130 via securing means. The securing means may include a locking knob 150 disposed in the leg mounts 130. For example, a first securing means (e.g., a first locking knob 150a) is disposed in the first leg mount 130a, a second securing means (e.g., a second locking knob 150b) is disposed in the second leg mount 130b, and a third securing means (e.g., a third locking knob 150c) is disposed in the third leg mount 130c. Locking knobs are well known to one of ordinary skill in the art. For example, locking knobs comprise a screw that can be tightened and loosened to either secure or release the leg in the leg mount.

Disposed near the bottom ends of each of the legs 140 is a spike 160, for example a first spike 160a is disposed near the bottom end of the first leg 140a, a second spike 160b is disposed near the bottom end of the second leg 140b, and a third spike 160c is disposed near the bottom end of the third leg 140c. The spikes 160 function to secure the support stand device 100 in a ground surface, for example the spikes 160 are driven into the ground surface to provide stability to the support stand device 100. Each of the spikes 160 are slidably disposed in a spike shaft (e.g., the first spike 160a is disposed in a first spike shaft, the second spike 160b is disposed in a second spike shaft, and the third spike 160c is dispose din a third spike shaft) disposed on the legs near the bottom ends. The spikes 160 can slide between multiple positions (in the respective spike shafts) including but not limited to a down position wherein the spike 160 is driven into the ground surface and an up position wherein the spike 160 is pulled upwardly in the spike shaft and out of the ground surface (see FIG. 1).

Disposed on the top end of each of the spikes 160 is a striking block 170 (e.g., a first striking block 170a, a second striking block 170b, and a third striking block 170c). The striking block 170 provides an easy means of pushing down on the spikes 160 into the ground surface. In some embodiments, a strike pad 172 is disposed atop each of the striking blocks 170 (e.g., to provide durability, for example). The spikes 160 can be secured in a position (e.g., an up position, a down position, a position in between) via a securing means. In some embodiments, the securing means includes a locking knob disposed in each of the spike shafts. For example, a fourth securing means (e.g., a fourth locking knob 150d) is disposed in the first spike shaft, a fifth securing means (e.g., a fifth locking knob 150e) is disposed in the second spike shaft, and a sixth securing means (e.g., a sixth locking knob 150f) is disposed in the third spike shaft. Locking knobs are well known to one of ordinary skill in the art. For example, locking knobs comprise a screw that can be tightened and loosened to either secure or release the spike in the spike shaft.

The disclosures of the following U.S. patents are incorporated in their entirety by reference herein: U.S. patent application Ser. No. 12/366,631.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A support stand device comprising:
   (a) a base having a top surface and a bottom surface;
   (b) a rebar bender mount extending upwardly from the top surface of the base, the rebar bender mount functions to engage a support beam of a rebar bender;
   (c) a first leg mount, a second leg mount, and a third leg mount each disposed in the base in a symmetrical configuration;
   (d) a first leg, a second leg, and a third leg adapted to removably engage the first leg mount, the second leg mount, and the third leg mount, respectively;
   (e) a first securing means disposed in the first leg mount, a second securing means disposed in the second leg mount, and a third securing means disposed in the third leg mount, the securing means each function to secure the leg in the respective leg mount;
   (f) a first spike shaft disposed near a bottom end of the first leg, a second spike shaft disposed near a bottom end of the second leg, and a third spike shaft disposed near a bottom end of the third leg;
   (g) a first spike slidably disposed in the first spike shaft, a second spike slidably disposed in the second spike shaft, and a third spike slidably disposed in the third spike shaft, the spikes can slide between multiple positions in their respective spike shafts including a down position wherein the spike is extended downwardly toward and optionally into a ground surface and an up position wherein the spike is pulled upwardly in the spike shaft and out of the ground surface, the spikes function to secure the support stand device in the ground surface;
   (h) a fourth securing means disposed in the first spike shaft, a fifth securing means disposed in the second spike shaft, and a sixth securing means disposed in the third spike shaft, the securing means each function to secure the spike in the respective spike shaft; and
   (i) a striking block disposed on each top end of the spikes, the striking blocks provide a means of moving the spikes from the up position to the down position.

2. The support stand device of claim 1, wherein the base has a generally triangular shape with flattened tips.

3. The support stand device of claim 1 further comprising floor brackets disposed on the bottom ends of each of the legs, the floor brackets function to help provide an even fit on a ground surface and allow the legs to be secured to the ground surface if desired.

4. The support stand device of claim 1, wherein the first securing means is a first locking knob, the second securing means is a second locking knob, and the third securing means is a third locking knob.

5. The support stand device of claim 1 further comprising a strike pad is disposed atop each of the striking blocks.

6. The support stand device of claim 1, wherein the fourth securing means is a fourth locking knob, the fifth securing means is a fifth locking knob, and the sixth securing means is a sixth locking knob.

* * * * *